Figure 1:
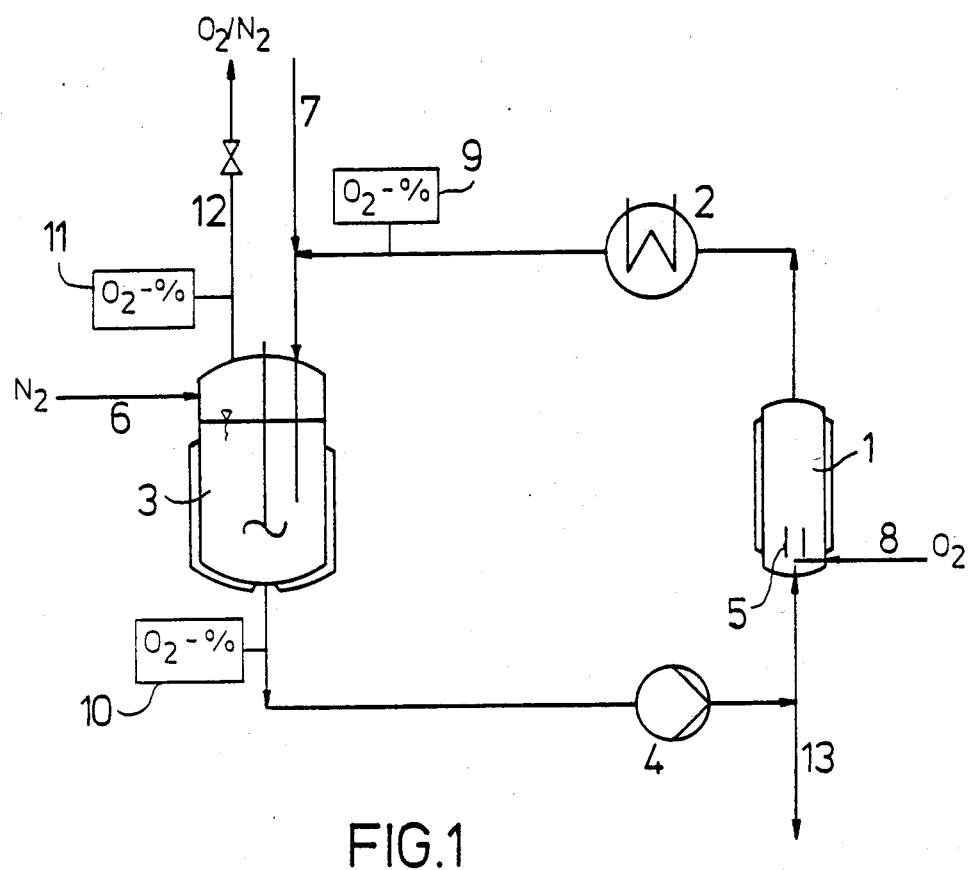

United States Patent [19]

Brandt et al.

[11] Patent Number: 4,696,996
[45] Date of Patent: Sep. 29, 1987

[54] PREPARATION OF POLYPHENYLENE ETHERS, AND AN APPARATUS FOR THIS PURPOSE

[75] Inventors: Hermann Brandt, Schifferstadt; Hermann Fischer, Limburgerhof; Hermann Dreher, Seeheim-Jugenheim; Eduard Heil, Limburgerhof; Juergen Hambrecht, Heidelberg; Herbert Naarmann, Wattenheim; Adolf Echte, Ludwigshafen; Hermann Gausepohl, Mutterstadt; Peter Siebel, Limburgerhof; Johann Swoboda, Ludwigshafen; Gerd Schwoebel, Wattenheim; Albert Nikles, Ludwigshafen, all of Fed. Rep. of Germany

[73] Assignee: BASF Aktiengesellschaft, Ludwigshafen, Fed. Rep. of Germany

[21] Appl. No.: 797,884

[22] Filed: Nov. 14, 1985

[30] Foreign Application Priority Data

Nov. 17, 1984 [DE] Fed. Rep. of Germany ....... 3442117

[51] Int. Cl.$^4$ .............................................. C08G 65/38
[52] U.S. Cl. .................................. 528/214; 528/212; 528/215; 528/216
[58] Field of Search ................ 528/212, 214, 215, 216

[56] References Cited

U.S. PATENT DOCUMENTS

| 3,306,874 | 2/1967 | Hay | 528/212 |
| 3,306,875 | 2/1967 | Hay | 528/212 |
| 4,477,649 | 10/1984 | Mobley | 528/212 |
| 4,556,699 | 12/1985 | Bialy et al. | 528/212 X |
| 4,578,449 | 3/1986 | Mobley | 528/212 |
| 4,607,085 | 8/1986 | Penczek et al. | 528/212 X |

FOREIGN PATENT DOCUMENTS

83/03833 11/1983 PCT Int'l Appl. .

Primary Examiner—Lucille M. Phynes
Attorney, Agent, or Firm—Keil & Weinkauf

[57] ABSTRACT

Polyphenylene ethers are prepared from monohydric phenols, which possess alkyl substituents in the two ortho-positions and, if desired, in the meta-position, but not in the para-position, by an oxidative coupling reaction with oxygen at from 15° to 50° C. and under from 1 to 10 bar in the presence of a catalyst complex, of a solvent and, if required, of an activator, by a method in which the conversion of the phenols is carried out in two more reaction zones, in which some or all of the solvent, the catalyst complex and the phenols and, where relevant, the activator is initially taken and is circulated by means of a conveying unit, and about 60–100% of the stoichiometric amount of oxygen required for the oxidative coupling is introduced into the first reaction zone and from 0 to about 40% of the said stoichiometric amount is introduced into the second reaction zone.

5 Claims, 2 Drawing Figures

PREPARATION OF POLYPHENYLENE ETHERS, AND AN APPARATUS FOR THIS PURPOSE

The present invention relates to a process for the preparation of polyphenylene ethers according to the preamble of claim 1, and to an apparatus for carrying out the process.

Polyphenylene ethers and processes for their preparation are disclosed in, for example, U.S. Pat. Nos. 3,306,874 and 3,306,875. According to these, the polymerization is carried out batchwise by oxidative coupling of monohydric phenols in one or more stirred reactors which are provided with cooling coils and cooling jackets and with a gas inlet tube, the catalyst complex of Cu salts and amines and the phenols being initially taken, or some or all of the catalyst complex and/or the phenols being fed in. The oxygen is metered in at a constant rate.

Furthermore, WO No. 83/03833 describes a process in which monomeric phenols together with solvents are metered into a stirred gassing reactor in which the catalyst complex is initially taken, with a constant supply of oxygen, over a particular period and at a constant rate, the aim being to change the molecular weight of the polyphenylene ether in a controlled manner and to reduce the amount of 4,4-diphenoquinones formed as by-products.

The conventional processes, in particular the metering of oxygen carried out in these processes, are not satisfactory in every respect. In order to keep the emission as low as possible, it is necessary for the amount of inert gas in the waste gas to be kept small. In this case, explosive gas mixtures can only reliably be avoided when the gas hold-up in the liquid phase is small, which inevitably leads to a low space-time yield. If, on the other hand, the space-time yield is increased by an appropriate high oxygen throughput, the dilution with inert gas necessary for avoiding an explosive gas atmosphere results in high emission values and, consequently, losses of volatile components of the reaction mixture. Furthermore, a constant gas feed or a controlled oxygen feed not adapted to the reaction and the formation of by-products has the disadvantage that a dissipation energy to be supplied for dispersing the gas has to be introduced in excess, and not in conformity with requirements.

Moreover, because they do not fully utilize existing plant capacities, the stated processes are uneconomical. In particular, the capacity of the heat exchanger is fully utilized only during the oligomerization phase.

It is an object of the present invention to improve the preparation of polyphenylene ethers so that the oxidative coupling of phenols with oxygen can be carried out economically and reliably, with very high space-time yields, formation of only a small amount of by-products, and minimum emissions of gas and volatile components.

We have found that this object is achieved by the measures according to the claims.

For the purposes of the present invention, high molecular weight polyphenylene ethers are the chains of alkyl-substituted benzene rings which are bonded in the para-position by oxygen atoms forming ether bonds, the said chains being obtained by oxidative coupling of 2,6-dialkyl- and/or 2,3,6-trialkylphenols. The polymers have number average molecular weights of from 10,000 to 30,000, preferably from 20,000 to 30,000, determined by the method described in Macromolecular Syntheses 1 (1978), 83. High molecular weight polyphenylene ethers are disclosed in U.S. Pat. Nos. 3,661,848, 3,219,625 and 3,378,505.

The monohydric phenols which are used for the preparation of the high molecular weight polyphenylene ethers and possess alkyl substituents in the two ortho-positions but not in the para-position are conventional phenols, such as 2,6-dimethylphenol, 2,6-diethylphenol, 2-methyl-6-ethylphenol, 2-methyl-6-tert.-butylphenol, 2-methyl-6-propylphenol, 2,6-dibutylphenol or 2,3,6-trimethylphenol, or mixtures of these.

Preferably, the monohydric phenol intended for the polymerization is employed together with o-cresol and p-cresol, each in an amount of less than 0.1% by weight. Particularly preferably, the monohydric phenol subjected to oxidative coupling contains less than 0.05% by weight of o-cresol and less than 0.01% by weight of p-cresol. In a particularly preferred process, the starting materials contain less than 0.02% by weight of phenol, m-cresol and polynuclear phenols.

The catalyst complex used for the oxidative coupling is a combination of one or more amines, such as dibutylamine, diethylamine, N,N'-di-tert.-butylethylenediamine, picoline, quinoline, pyridine bases, triisopropylamine, dimethylbutylamine. dimethylisopropanolamine, triethanolamine, triisopropanolamine, diisopropanolamine or N-butylimidazole, with a copper salt, such as copper(I) bromide, copper(I) chloride, copper(I) iodide, copper(II) acetate, copper(II) propionate. copper(II) acetoacetate or copper(II) acetylacetonate.

Copper(I) and (II) halides may also be produced from copper oxide by reaction with the hydrogen halide.

Usually, the amines employed are preferably used in an amount of from 2.0 to 25.0 moles per 100 moles of monomer, but the concentration of the amines in the reaction mixture can vary within wide limits; however, low concentrations are advantageous. The concentration of the copper salt is kept low and is preferably from 0.2 to 2.5 moles per 100 moles of monomer.

However, the oxidative coupling may also be carried out in the presence of an Mn chelate complex, as described in, for example, German Laid-Open Application DOS No. 2,752,294. Mn(II) hydroxyoxime chelate complexes are preferably used.

The amount of solvent is usually from 1:1 to 20:1, i.e. not more than a 20-fold excess of solvent, based on the monomer. The solvent used should be an aromatic $C_7$-$C_{10}$-hydrocarbon, which may furthermore contain a small amount of an alkanol. Particularly suitable hydrocarbons are ethylbenzene, xylene, diethylbenzene and mixtures of these, ethylbenzene or toluene being preferably used. Suitable alkanols are known, eg. ethanol and/or isopropanol. The solvent is preferably used in an amount of from 1 to 10 parts by weight per part by weight of the monomeric phenol.

According to U.S. Pat. No. 3,544,515, the reaction mixture may furthermore contain an activator, such as a diarylguanidine, a diarylformamidine or an alkali metal.

In the novel polymerization process, conversion of the monohydric phenols takes place in two or more reaction zones. These consist of a jet reactor on the one hand and a stirred reactor on the other hand. Heat exchangers and a conveying unit are provided between the reaction zones. For oxidative coupling, about 60–100% of the stoichiometric amount of oxygen is fed to the jet reactor, and from 0 to about 40% of this amount is fed to the stirred reactor. The oxygen is preferably fed in so that more than 95% of it is reacted. The stoichiometric amount of oxygen is the amount required to couple the phenols to form polyphenylene ethers having an intrinsic viscosity of from 0.4 to 1.0 dl/g, measured at 25° C. in chloroform. The oxidative coupling is carried out either by initially taking the total amount of monomers, solvent and catalyst or by initially taking the total amount of catalyst together with some of the solvent and, if desired, some of the phenol and feeding in the remaining amount of phenol with or without the solvent. In this procedure, as much as 90% by volume of the liquid components of the total reaction mixture is present in the reaction zones at the beginning of the feed step. It has been found that the amount of by-product, such as 3,3',5,5-tetramethyl-4,4'-diphenoquinone is consequently less than 0.7%, based on the phenol employed.

The oxidative coupling is carried out continuously or batchwise under substantially isothermal and isobaric conditions, at in general from 15° to 50° C., preferably from 25° to 30° C., and under from 1 to 10, preferably from 1 to 4, bar absolute. Substantially isothermal conditions are understood as meaning that the temperature at the exit of the heat exchanger varies in a range of only ±3° C. Substantially isobaric conditions are intended to mean that the pressure in the gas phase of the second reaction zone deviates within about ±0.2 bar. The heat exchangers used for an isothermal procedure are designed so that separation of the gas/liquid dispersion is prevented.

The purpose of the conveying unit is to deliver the volume required for conducting away the heat of reaction in the heat exchanger, and to introduce the dissipation energy required for dispersing the gas phase in the first reaction zone. The design of the apparatus should ensure that up to 20% by volume of gas can be conveyed in the liquid phase.

The volume circulated per hour is usually from 5 to 50 times the total volume in the reaction zones.

In the process according to the invention, the metering of the oxygen required for oxidative coupling into the reaction zones acquires particular importance in connection with emission of gases and volatile components, safety, and space-time yield. Safe operation is ensured when the concentration of the oxygen in the waste gas from the second reaction zone is below the lower explosion limit. Hence, this concentration is measured using commercial probes, eg. Hersch or Clark cells. Before the critical oxygen concentration is reached, nitrogen is introduced into the gas space of the second reaction zone, as a diluent. Alternatively, the critical oxygen concentration can be avoided by reducing the feed of oxygen into the first and/or second reaction zone.

The above measures for the metering of the oxygen permit safe operation coupled with low emission values. A controlled oxygen feed adapted to the reaction and to the formation of by-products is possible if the amount of oxygen dissolved in the liquid phase in the reaction zones is determined. This microkinetic parameter permits the progress of the reaction, and hence the actual oxygen demand, to be quantified. On the basis of this parameter, the oligomerization phase and hence the period of high oxygen demand can be distinguished from the polymerization phase, i.e. the phase where the oxygen demand is low.

The oligomerization phase is the period up to the time when the intrinsic viscosity reaches $\leq 0.1$ dl/g, measured in chloroform at 25° C.

Thus, in conjunction with the measurement of the oxygen content in the waste gas, metering of oxgyen can be controlled in such a way that, during the reaction, the concentration of the dissolved oxygen downstream of the first reaction zone is greater than 60% of the saturation concentration, and at a concentration of from about 30% to about 80% of the saturation value, measured downstream of the second reaction zone or in this zone, the amount of oxygen introduced into the first and/or second reaction zone is reduced.

The saturation concentration is the equilibrium concentration, under the working pressure and at the working temperature, in a polymer solution having an intrinsic viscosity of 0.4 dl/g, measured at 25° C. in chloroform.

The advantages of these measures include safe operation of the plant coupled with a maximum space-time yield and minimum emissions of gases and volatile components.

Finally, according to the invention, the content of by-products, such as 4,4'-diphenoquinones, is also surprisingly low, being less than 0.7%, based on the phenol employed.

In a particularly preferred embodiment of the novel process, the entire reaction solution is conveyed into a third reaction zone after 80% of the total stoichiometric amount of oxygen has been converted, and polymerization is continued in the said zone until an intrinsic viscosity of from 0.4 to 1 dl/g, measured at 25° C. in chloroform, has been reached. In the first and second reaction zones, the monomers are converted to oligomers. After these have been transferred to the third reaction zone, the first and second reaction zones are therefore available for oligomerization of a further batch. Consequently, the installed components of the apparatus, which are designed in principle for high oxygen demand, substantial evolution of heat, high circulation rates and the production of a sufficiently large mass transfer area, can be optimally utilized at any time. In the third reaction zone, in which the oligomers react to form polymers, heat exchangers and conveying units are not absolutely necessary. We have found that, in this way, it is possible to achieve a substantial increase in the space-time yield and more efficient use of the apparatus. Moreover, the apparatuses, some of which are sensitive, can be used in such a way that the products employed show virtually no tendency to form encrustations on the apparatus or to adhere to the latter, even at high concentrations of phenols.

The oxygen still required for the synthesis of the polymers passes essentially in a physically dissolved form from the first and second reaction zones into the third reaction zone, together with the reaction solution. If required, however, additional gaseous oxygen may be metered into the third reaction zone. The low oxygen demand in the third reaction zone ensures that an isothermal procedure can be employed, even without cooling capacities. Emissions of gases and volatile components are substantially avoided.

An apparatus for carrying out the process according to the invention consists of two or more reactor units, one of which is a jet reactor and the other or others are stirred reactor(s). In the jet reactor, which preferably can be cooled, the liquid phase is fed to the lower part of the reactor via a jet nozzle, so that it is in the form of a fine jet and hence disperses the oxygen metered in via a gas inlet tube, in a crosswise direction with respect to the jet. This primary dispersion is converted to a very fine dispersion by a momentum-exchange chamber located in the jet reactor, above the jet nozzle. The formation of a large mass transfer area in the jet reactor results in a high mass transfer rate, which in turn causes the reaction to take place in a kinetically controlled manner. The reactor efficiency is thus close to unity.

The major part of the heat of reaction formed in the jet reactor is conducted away in the downstream heat exchanger. The cooling capacity provided should be sufficient to establish isothermal conditions in the product stream at the exit of the heat exchanger. The heat exchanger should be designed so that the gas/liquid dispersion leaving the jet reactor does not separate out into its component phases, and the walls of the heat exchanger remain free from coatings. This maintains the fine gas dispersion and achieves higher heat transfer rates. Moreover, the gas/liquid phase leaving the jet reactor is kept in the form of a dispersion.

Hence, the downstream stirred reactor need not possess a dispersing organ but merely requires a stirring element which produces laminar flow and therefore prevents the disperse gas phase from rising. The disperse reaction solution is fed via a dip tube into the stirred reactor, which can generally be cooled. Blanketing with nitrogen in the free gas space of the stirred reactor, which may sometimes be necessary, is carried out so that a concentration gradient is avoided inside the gas space, thus ensuring safe operation.

A conveying unit is provided downstream of the stirred reactor in order to maintain circulation of the reaction solution. A suitable conveying unit is a pump whose function is not adversely affected by up to 20% by volume of gas, and in which separation of the gas/liquid dispersion is prevented because of the accelerating field in the pump and no cavitation occurs. Pumps which have proven useful are rotary pumps and centrifugal pumps, in particular centrifugal pumps with baffles at the intake port or inducers mounted on the shaft. The delivery of the pump should be chosen so that, on the one hand, the jet energy required for dispersing the gas phase in the jet reactor is provided and, on the other hand, the flow velocity achievable in the heat exchanger does not have an adverse effect on the functioning of the heat exchanger. The volume circulated per hour is advantageously from 5 to 50, preferably from 6 to 20, times the contents of the circulation system.

According to a further characteristic feature of the invention, one or more tube reactors connected in parallel or in series and connected by pipelines to the circulation system can be arranged downstream of the conveying unit. This makes it possible to carry out the oxidative coupling reaction both continuously and batchwise. In the continuous procedure, the tube reactors are connected in series, at least the first stirred kettle being equipped with an apparatus for feeding in oxygen. In the batchwise procedure and where a plurality of stirred reactors are used, these reactors are connected in parallel.

The two Examples below illustrate the invention with reference to the drawings.

In FIG. 1, a jet reactor (1), a heat exchanger (2), a stirred reactor (3) and a centrifugal pump (4) are connected to one another via pipelines to form a circulation system. A momentum-exchange chamber (5) is indicated in the lower part of the jet reactor. When the circulation system has been blanketed with nitrogen via line (6), the required volume of the aromatic $C_7$-$C_{10}$-hydrocarbon is introduced via (7) so that not more than 90% of the useful circulation volume is filled. After the stirrer of the stirred reactor (3) and the centrifugal pump (4) have been started up, the catalyst complex is fed in, likewise via (7). The amount of phenol to be polymerized is then metered in via the same feed nozzle (7) at a rate such that the feed time is not more than 90% of the total reaction time required.

(8) denotes an apparatus for feeding oxygen into the jet reactor (1). The concentration of the dissolved oxygen can be measured at (9) and (10). The apparatus (11) measures the oxygen content in the waste gas line (12). When the polymer solution reaches the required intrinsic viscosity, it is fed to the further process stages via a pipeline (13).

Figure 2:
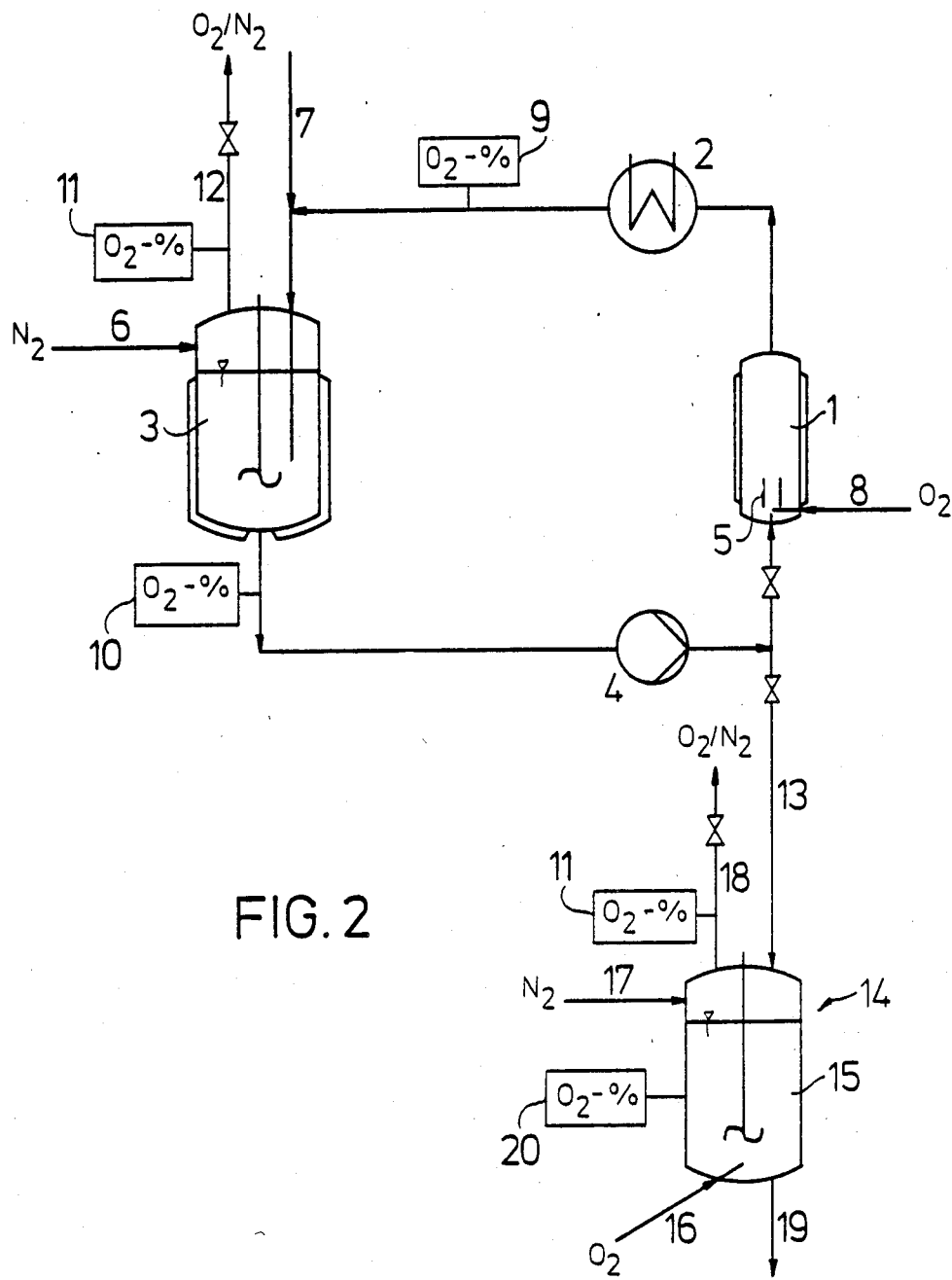

In FIG. 2, the pipeline (13) ends in a further reactor unit (14). This comprises a stirred reactor (15), an apparatus (16) for feeding in oxygen and pipelines (17) for feeding in nitrogen, (18) for removing the waste gas and (19) for discharging the product. A measuring apparatus (20) is connected to the waste gas line (18). A further measuring apparatus (20) for determining the amount of oxygen dissolved in the reaction solution is connected to the stirred reactor (15).

EXAMPLE 1

The following mixture is initially taken in the circulation system shown in FIG. 1:
45.76 moles of toluene,
0.087 mole of copper(I) bromide and
1.596 moles of di-n-butylamine.
A monomer solution consisting of
8.00 moles of 2,6-dimethylphenol and
9.90 moles of toluene
is metered to the stirred reactor in the course of 30 minutes, into this solution which is circulated at a rate of 120 l/h, blanketed via the stirred reactor with 80 l/h of nitrogen and heated at 25° C. When the monomer feed is begun, the reaction solution is gassed with oxygen in the jet reactor. To do this, the initial rate of introduction of oxygen is set at 30 l/h. By measuring the oxygen content in the waste gas line and measuring the amount of oxygen dissolved in the liquid phase, the oxygen feed can be subsequently adjusted so that, at a constant nitrogen feed of 80 l/h, the oxygen content of the waste gas does not increase above 4%. After a reaction time of 60 minutes, a polyphenylene ether having an intrinsic viscosity of 0.63 dl/g, measured at 25° C. in chloroform, and, as a by-product, 0.6%, based on the monomer used, of diphenoquinone are obtained.

EXAMPLE 2

Example 1 is repeated, except that, 10 minutes after the end of the monomer feed, the reaction solution is conveyed from the circulation system into a further stirred reactor (FIG. 2), where it is further gassed by feeding in oxygen at a constant rate of 10 l/h.

After a total reaction time of 120 minutes, a polyphenylene ether having an intrinsic viscosity of 0.66 dl/g, measured at 25° C. in chloroform, and, as a by-product, 0.6%, based on the monomer used, of diphenoquinone are obtained.

We claim:

1. A process for the preparation of a polyphenylene ether from a monohydric phenol having alkyl substituents in the two ortho-positions, but not in the para-position, by an oxidative coupling reaction with oxygen at from 15° to 50° C. and under from 1 to 10 bar in the presence of a catalyst complex and a solvent, wherein the conversion of the phenol is carried out in two or more reaction zones in which some or all of the solvent, the catalyst complex and the phenol is initially added to a reaction zone and is circulated by means of a conveying unit in such a way that the volume circulated per hour is from 5 to 50 times the total volume in the reaction zones, and about 60–100% of the stoichiometric amount of oxygen required in the oxidative coupling is introduced into the first reaction zone while from 0 to about 40% of the said stoichiometric amount is introduced into the second reaction zone, the heat of reaction produced in the reaction zones being removed in the reaction zone itself and/or downstream of this.

2. The process of claim 1, wherein the oxygen concentration in the gas phase of the second reaction zone is measured and nitrogen is fed in at a critical oxygen concentration in the gas space of the second reaction zone.

3. The process of claim 1, wherein the oxygen concentration in the gas phase of the second reaction zone is measured and the feed of oxygen into the first and/or second reaction zone is reduced at a critical oxygen concentration.

4. The process of claim 1, wherein the concentration of the oxygen dissolved in the reaction zones is measured and is used, in conjunction with the measurement of the oxygen content of the waste gas, as a control parameter for the metering of oxygen.

5. The process of claim 1, wherein the oxidative coupling reaction in the first and second reaction zone is carried out to a conversion of $\geq 80\%$ of the total stoichiometric amount of oxygen required and that in a third reaction zone is carried out until an intrinsic viscosity of from 0.4 to 1.0 dl/g, measured at 25° C. in chloroform, is reached.

* * * * *